United States Patent
Girgis et al.

(10) Patent No.: US 9,275,669 B1
(45) Date of Patent: Mar. 1, 2016

(54) TBFECO IN PMR MEDIA FOR SNR IMPROVEMENT

(71) Applicant: WD Media, LLC, San Jose, CA (US)

(72) Inventors: Emad Girgis, San Jose, CA (US);
Prakash Mani, Fremont, CA (US);
Cristian Papusoi, Santa Clara, CA (US);
Mrugesh Desai, San Jose, CA (US);
Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/675,588

(22) Filed: Mar. 31, 2015

(51) Int. Cl.
*G11B 5/73* (2006.01)
*G11B 5/66* (2006.01)

(52) U.S. Cl.
CPC ... *G11B 5/66* (2013.01); *G11B 5/73* (2013.01)

(58) Field of Classification Search
CPC .............. G11B 5/73; G11B 5/74; G11B 5/82
USPC .................. 360/135; 428/848.1, 848.3, 848.6
See application file for complete search history.

(56) References Cited

U.S. PATENT DOCUMENTS

| | | | |
|---|---|---|---|
| 5,808,988 A * | 9/1998 | Maeda | G11B 7/005 369/275.3 |
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |
| 6,210,819 B1 | 4/2001 | Lal et al. | |
| 6,216,709 B1 | 4/2001 | Fung et al. | |
| 6,221,119 B1 | 4/2001 | Homola | |
| 6,248,395 B1 | 6/2001 | Homola et al. | |
| 6,261,681 B1 | 7/2001 | Suekane et al. | |
| 6,270,885 B1 | 8/2001 | Hokkyo et al. | |
| 6,274,063 B1 | 8/2001 | Li et al. | |
| 6,283,838 B1 | 9/2001 | Blake et al. | |
| 6,287,429 B1 | 9/2001 | Moroishi et al. | |
| 6,290,573 B1 | 9/2001 | Suzuki | |
| 6,299,947 B1 | 10/2001 | Suzuki et al. | |
| 6,303,217 B1 | 10/2001 | Malhotra et al. | |
| 6,309,765 B1 | 10/2001 | Suekane et al. | |
| 6,358,636 B1 | 3/2002 | Yang et al. | |
| 6,362,452 B1 | 3/2002 | Suzuki et al. | |
| 6,363,599 B1 | 4/2002 | Bajorek | |
| 6,365,012 B1 | 4/2002 | Sato et al. | |
| 6,381,090 B1 | 4/2002 | Suzuki et al. | |
| 6,381,092 B1 | 4/2002 | Suzuki | |
| 6,387,483 B1 | 5/2002 | Hokkyo et al. | |

(Continued)

*Primary Examiner* — Allen T Cao

(57) ABSTRACT

The present disclosure generally relates to a PMR media for use in a HDD. The PMR media has an amorphous ferri-magnetic material layer disposed within the capping structure. The amorphous ferri-magnetic material layer reduces the noise. The amorphous ferri-magnetic material layer may be disposed between capping layer or on top of the capping layers. Additionally, the amorphous ferri-magnetic material layer may contain Tb.

20 Claims, 4 Drawing Sheets

(56) References Cited

U.S. PATENT DOCUMENTS

| | | | |
|---|---|---|---|
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,773,826 B2 | 8/2004 | Nakagawa et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,635,498 B2 | 12/2009 | Sakai et al. |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,691,499 B2 * | 4/2010 | Wu et al. ............... 428/827 |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B2 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |

(56) References Cited

U.S. PATENT DOCUMENTS

| | | | |
|---|---|---|---|
| 8,492,011 B2 | 7/2013 | Itoh et al. | |
| 8,496,466 B1 | 7/2013 | Treves et al. | |
| 8,517,364 B1 | 8/2013 | Crumley et al. | |
| 8,517,657 B2 | 8/2013 | Chen et al. | |
| 8,524,052 B1 | 9/2013 | Tan et al. | |
| 8,530,065 B1 | 9/2013 | Chernyshov et al. | |
| 8,546,000 B2 | 10/2013 | Umezawa | |
| 8,551,253 B1 | 10/2013 | Na'im et al. | |
| 8,551,627 B2 | 10/2013 | Shimada et al. | |
| 8,556,566 B1 | 10/2013 | Suzuki et al. | |
| 8,559,131 B2 | 10/2013 | Masuda et al. | |
| 8,562,748 B1 | 10/2013 | Chen et al. | |
| 8,565,050 B1 | 10/2013 | Bertero et al. | |
| 8,570,844 B1 | 10/2013 | Yuan et al. | |
| 8,580,410 B2 | 11/2013 | Onoue | |
| 8,584,687 B1 | 11/2013 | Chen et al. | |
| 8,591,709 B1 | 11/2013 | Lim et al. | |
| 8,592,061 B2 | 11/2013 | Onoue et al. | |
| 8,596,287 B1 | 12/2013 | Chen et al. | |
| 8,597,723 B1 | 12/2013 | Jung et al. | |
| 8,603,649 B2 | 12/2013 | Onoue | |
| 8,603,650 B2 | 12/2013 | Sonobe et al. | |
| 8,605,388 B2 | 12/2013 | Yasumori et al. | |
| 8,605,555 B1 | 12/2013 | Chernyshov et al. | |
| 8,608,147 B1 | 12/2013 | Yap et al. | |
| 8,609,263 B1 | 12/2013 | Chernyshov et al. | |
| 8,619,381 B2 | 12/2013 | Moser et al. | |
| 8,623,528 B2 | 1/2014 | Umezawa et al. | |
| 8,623,529 B2 | 1/2014 | Suzuki | |
| 8,634,155 B2 | 1/2014 | Yasumori et al. | |
| 8,658,003 B1 | 2/2014 | Bourez | |
| 8,658,292 B1 | 2/2014 | Mallary et al. | |
| 8,665,541 B2 | 3/2014 | Saito | |
| 8,668,953 B1 | 3/2014 | Buechel-Rimmel | |
| 8,674,327 B1 | 3/2014 | Poon et al. | |
| 8,685,214 B1 | 4/2014 | Moh et al. | |
| 8,696,404 B2 | 4/2014 | Sun et al. | |
| 8,711,499 B1 | 4/2014 | Desai et al. | |
| 8,728,637 B2 * | 5/2014 | Wu et al. | 428/827 |
| 8,743,666 B1 | 6/2014 | Bertero et al. | |
| 8,758,912 B2 | 6/2014 | Srinivasan et al. | |
| 8,787,124 B1 | 7/2014 | Chernyshov et al. | |
| 8,787,130 B1 | 7/2014 | Yuan et al. | |
| 8,791,391 B2 | 7/2014 | Bourez | |
| 8,795,765 B2 | 8/2014 | Koike et al. | |
| 8,795,790 B2 | 8/2014 | Sonobe et al. | |
| 8,795,857 B2 | 8/2014 | Ayama et al. | |
| 8,800,322 B1 | 8/2014 | Chan et al. | |
| 8,811,129 B1 | 8/2014 | Yuan et al. | |
| 8,817,410 B1 | 8/2014 | Moser et al. | |
| 8,873,203 B2 * | 10/2014 | Hoshino | 360/319 |
| 2002/0060883 A1 | 5/2002 | Suzuki | |
| 2003/0022024 A1 | 1/2003 | Wachenschwanz | |
| 2003/0064249 A1 | 4/2003 | Uwazumi et al. | |
| 2004/0022387 A1 | 2/2004 | Weikle | |
| 2004/0132301 A1 | 7/2004 | Harper et al. | |
| 2004/0202793 A1 | 10/2004 | Harper et al. | |
| 2004/0202865 A1 | 10/2004 | Homola et al. | |
| 2004/0209123 A1 | 10/2004 | Bajorek et al. | |
| 2004/0209470 A1 | 10/2004 | Bajorek | |
| 2005/0036223 A1 | 2/2005 | Wachenschwanz et al. | |
| 2005/0142990 A1 | 6/2005 | Homola | |
| 2005/0150862 A1 | 7/2005 | Harper et al. | |
| 2005/0151282 A1 | 7/2005 | Harper et al. | |
| 2005/0151283 A1 | 7/2005 | Bajorek et al. | |
| 2005/0151300 A1 | 7/2005 | Harper et al. | |
| 2005/0155554 A1 | 7/2005 | Saito | |
| 2005/0167867 A1 | 8/2005 | Bajorek et al. | |
| 2005/0263401 A1 | 12/2005 | Olsen et al. | |
| 2006/0147758 A1 | 7/2006 | Jung et al. | |
| 2006/0181697 A1 | 8/2006 | Treves et al. | |
| 2006/0207890 A1 | 9/2006 | Staud | |
| 2007/0070549 A1 | 3/2007 | Suzuki et al. | |
| 2007/0087227 A1 * | 4/2007 | Ma et al. | 428/833.1 |
| 2007/0245909 A1 | 10/2007 | Homola | |
| 2007/0248843 A1 * | 10/2007 | Wu et al. | 428/827 |
| 2008/0075845 A1 | 3/2008 | Sonobe et al. | |
| 2008/0093760 A1 | 4/2008 | Harper et al. | |
| 2009/0117408 A1 | 5/2009 | Umezawa et al. | |
| 2009/0136784 A1 | 5/2009 | Suzuki et al. | |
| 2009/0161268 A1 * | 6/2009 | Lin | 360/324.11 |
| 2009/0169922 A1 | 7/2009 | Ishiyama | |
| 2009/0191331 A1 | 7/2009 | Umezawa et al. | |
| 2009/0202866 A1 | 8/2009 | Kim et al. | |
| 2009/0205948 A1 * | 8/2009 | Berger et al. | 204/192.1 |
| 2009/0311557 A1 | 12/2009 | Onoue et al. | |
| 2010/0119877 A1 * | 5/2010 | Wu et al. | 428/827 |
| 2010/0124672 A1 * | 5/2010 | Thangaraj et al. | 428/833.1 |
| 2010/0143752 A1 | 6/2010 | Ishibashi et al. | |
| 2010/0190035 A1 | 7/2010 | Sonobe et al. | |
| 2010/0196619 A1 | 8/2010 | Ishiyama | |
| 2010/0196740 A1 | 8/2010 | Ayama et al. | |
| 2010/0209601 A1 | 8/2010 | Shimokawa et al. | |
| 2010/0215992 A1 | 8/2010 | Horikawa et al. | |
| 2010/0232065 A1 | 9/2010 | Suzuki et al. | |
| 2010/0247965 A1 | 9/2010 | Onoue | |
| 2010/0261039 A1 | 10/2010 | Itoh et al. | |
| 2010/0279151 A1 | 11/2010 | Sakamoto et al. | |
| 2010/0300884 A1 | 12/2010 | Homola et al. | |
| 2010/0304186 A1 | 12/2010 | Shimokawa | |
| 2011/0097603 A1 | 4/2011 | Onoue | |
| 2011/0097604 A1 | 4/2011 | Onoue | |
| 2011/0171495 A1 | 7/2011 | Tachibana et al. | |
| 2011/0206947 A1 | 8/2011 | Tachibana et al. | |
| 2011/0212346 A1 | 9/2011 | Onoue et al. | |
| 2011/0223446 A1 | 9/2011 | Onoue et al. | |
| 2011/0244119 A1 | 10/2011 | Umezawa et al. | |
| 2011/0299194 A1 | 12/2011 | Aniya et al. | |
| 2011/0311841 A1 | 12/2011 | Saito et al. | |
| 2012/0069466 A1 | 3/2012 | Okamoto et al. | |
| 2012/0070692 A1 | 3/2012 | Sato et al. | |
| 2012/0077060 A1 | 3/2012 | Ozawa | |
| 2012/0127599 A1 | 5/2012 | Shimokawa et al. | |
| 2012/0127601 A1 | 5/2012 | Suzuki et al. | |
| 2012/0129009 A1 | 5/2012 | Sato et al. | |
| 2012/0135274 A1 * | 5/2012 | Wang et al. | 428/828.1 |
| 2012/0140359 A1 | 6/2012 | Tachibana | |
| 2012/0141833 A1 | 6/2012 | Umezawa et al. | |
| 2012/0141835 A1 | 6/2012 | Sakamoto | |
| 2012/0148875 A1 | 6/2012 | Hamakubo et al. | |
| 2012/0156523 A1 | 6/2012 | Seki et al. | |
| 2012/0164488 A1 | 6/2012 | Shin et al. | |
| 2012/0170152 A1 | 7/2012 | Sonobe et al. | |
| 2012/0171369 A1 | 7/2012 | Koike et al. | |
| 2012/0175243 A1 | 7/2012 | Fukuura et al. | |
| 2012/0189872 A1 | 7/2012 | Umezawa et al. | |
| 2012/0196049 A1 | 8/2012 | Azuma et al. | |
| 2012/0207919 A1 | 8/2012 | Sakamoto et al. | |
| 2012/0225217 A1 | 9/2012 | Itoh et al. | |
| 2012/0251842 A1 | 10/2012 | Yuan et al. | |
| 2012/0251846 A1 | 10/2012 | Desai et al. | |
| 2012/0276417 A1 | 11/2012 | Shimokawa et al. | |
| 2012/0308722 A1 | 12/2012 | Suzuki et al. | |
| 2013/0040167 A1 | 2/2013 | Alagarsamy et al. | |
| 2013/0071694 A1 | 3/2013 | Srinivasan et al. | |
| 2013/0165029 A1 | 6/2013 | Sun et al. | |
| 2013/0175252 A1 | 7/2013 | Bourez | |
| 2013/0216865 A1 | 8/2013 | Yasumori et al. | |
| 2013/0230647 A1 | 9/2013 | Onue et al. | |
| 2013/0314815 A1 | 11/2013 | Yuan et al. | |
| 2014/0011054 A1 | 1/2014 | Suzuki | |
| 2014/0044992 A1 | 2/2014 | Onoue | |
| 2014/0050843 A1 | 2/2014 | Yl et al. | |
| 2014/0145792 A1 * | 5/2014 | Wang | H01F 10/3272 331/94.1 |
| 2014/0151360 A1 | 6/2014 | Landdell et al. | |
| 2014/0177093 A1 * | 6/2014 | Hoshino | G11B 5/11 360/75 |
| 2014/0234666 A1 | 8/2014 | Knigge et al. | |

* cited by examiner

TBFECO IN PMR MEDIA FOR SNR IMPROVEMENT

BACKGROUND

1. Field of the Disclosure

Embodiments of the present disclosure generally relate to perpendicular magnetic recording (PMR) media in a hard disk drive (HDD).

2. Description of the Related Art

In HDDs, a magnetic head is disposed over a magnetic media. The magnetic head reads from, and writes data to, the magnetic media. The magnetic head has a surface, referred to as an air bearing surface (ABS), facing the magnetic media. As the magnetic media moves, air exerts a pressure on the ABS and pushes the magnetic head away from the magnetic media. The magnetic head is formed on a slider, which is coupled to a suspension. The suspension exerts a counter force that, when considered in concert with the moving media, ensures the magnetic head is disposed a predetermined distance from the magnetic media during operation.

PMR has been used to increase the areal recording density of magnetic storage media. A PMR media stack generally includes a substrate, several magnetic layers, one or more exchange control layers, a capping structure and a carbon overcoat layer. The signal-to-noise ratio (SNR) of a PMR media stack can be quite high.

Therefore, there is a need in the art for an improved PMR media with reduced noise.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
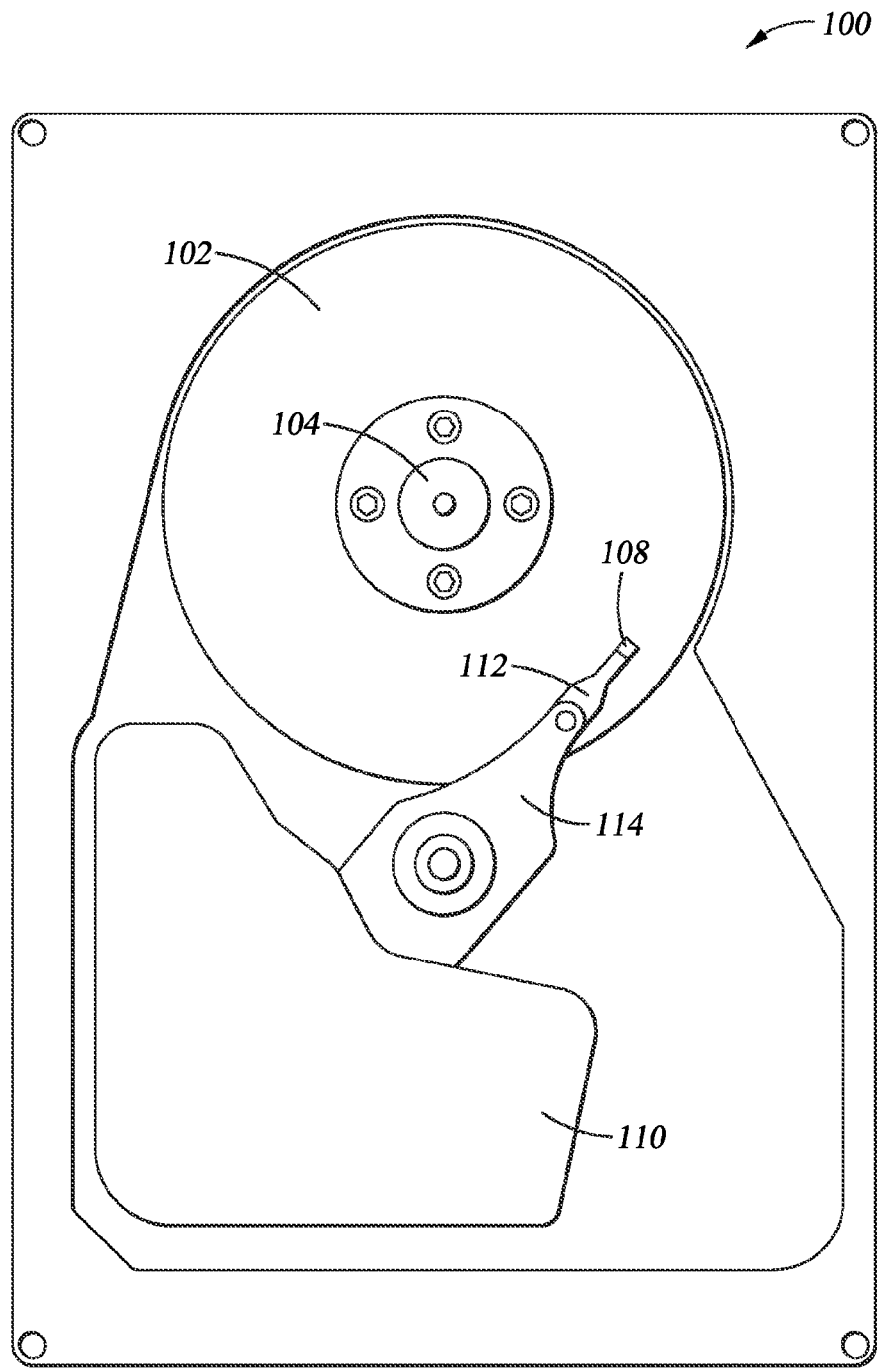
FIG. 1 is a schematic illustration of a HDD according to one embodiment.

To facilitate understanding, identical reference numerals have been used, where possible, to designate identical elements that are common to the figures. It is contemplated that elements disclosed in one embodiment may be beneficially utilized on other embodiments without specific recitation. It is to be understood that all drawings are not to scale.

DETAILED DESCRIPTION

The present disclosure generally relates to a PMR media for use in a HDD. The PMR media has an amorphous ferri-magnetic material layer disposed within the capping structure. The amorphous ferri-magnetic material layer reduces the noise. The amorphous ferri-magnetic material layer may be disposed between capping layer or on top of the capping layers. Additionally, the amorphous ferri-magnetic material layer may contain Tb.

FIG. 1 is a schematic illustration of a magnetic recording device, such as a hard disk drive (HDD) 100 according to one embodiment. The HDD 100 includes at least one magnetic recording medium, such as a disk 102 that is supported on a spindle 104. A motor causes the spindle 104, and hence the disk 102, to rotate. A magnetic head that is mounted on a slider 108 moves over the disk 102 to read and write information from/to the disk 102. The head rides on an air bearing above the disk 102 during read/write operations. The slider 108 is coupled to an actuator 110 by a suspension 112 and arm 114. The suspension 112, which may comprise stainless steel, provides a slight spring force, which biases the slider 108 towards the disk surface. Each actuator 110 is attached to an actuator means that controls the movement of the head 106 relative to the disk 102.

Figure 2:
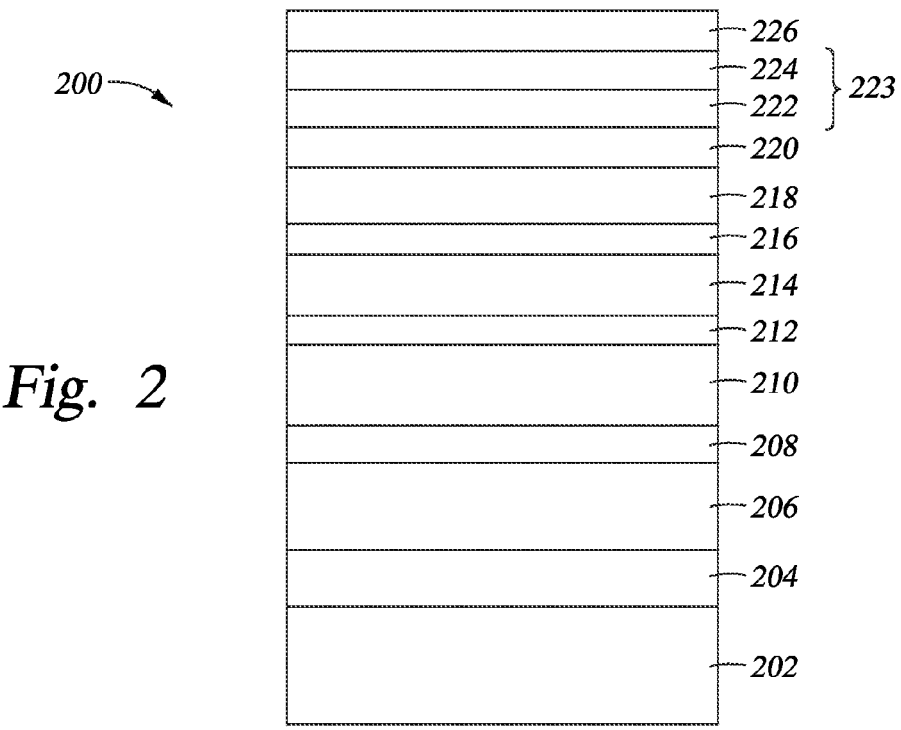
FIG. 2 is a schematic illustration PMR media stack.

FIG. 2 is a schematic illustration PMR media stack 200. The PMR stack 200 includes a SUL layer 202 and a seed layer 204. In one embodiment, the SUL layer 202 may comprise an antiferromagnetic material. In another embodiment, the seed layer 204 may contain nickel, iron, or combinations thereof. One or more intermediate under layers 206 may be present on the seed layer 204. In one embodiment, the intermediate under layer 206 may comprise ruthenium. A grain isolation initiation layer (GIIL) 208 may be disposed on the intermediate under layer 206. In one embodiment, the GIIL layer 208 may comprise a cobalt-chromium oxide.

One or more first magnetic layers 210 may be present on the GIIL layer 208. A first exchange break layer (EBL) 212 may be disposed on the one or more first magnetic layers 210. One or more second magnetic layers 214 may be disposed on the first exchange break layer 212, and a second exchange break layer (EBL) 216, may be disposed on the one or more second magnetic layers 214. One or more third magnetic layers 218 may be present on the second EBL 216, and a third EBL 220 may be present on the one or more third magnetic layers 218. A capping structure 223 may be present on the third EBL 220. The capping structure 223 includes a first capping layer 222 and a second capping layer 224. A carbon overcoat layer 226 is disposed on the capping structure 223. The one or more first magnetic layers 210, the one or more second magnetic layers 214 and the one or more third magnetic layers 218 may include a CoPtX-oxide alloy, wherein X is selected from the group consisting of Cr, Ru, and B, and the oxide is selected from the group consisting of $TiO_2$, $SiO_2$, $Cr_2O_3$, and $B_2O_3$. In one embodiment, the first, second, and third EBLs 212, 216, 220 may include a CoCrRu-oxide. In one embodiment, the GIIL 208 may include a material selected from the group consisting of a CoCrRu-oxide and a CoCr-oxide. In one embodiment, the first, second and third EBLs 212, 216, 220 may include a number of EBLs, and two of the EBLs may include different materials. The GIIL can enhance magnetic decoupling of the magnetic layers, and the EBLs help to reduce the coercivity (Hc) and saturation field (Hs) of the PMR media stack as a whole.

As noted above, PMR media may have an undesirably high noise. Amorphous ferri-magnetic material may be used in the capping structure to reduce the noise. TbFeCo is a well-known ferri-magnetic material. TbFeCo is amorphous and has a very high magnetic anisotropy ($K_u$) while possessing low saturation magnetization ($M_s$). By appropriate choice of composition (RE Tb vs. TM Co/Fe), it is possible to tailor the magnetic properties such as Ms, Ku, $T_c$ (curie temperature) and $T_{comp}$ (compensation temperature).

As discussed herein, Applicants have discovered that using an amorphous ferri-magnetic material layer in the capping structure of a PMR media will reduce noise, yet have minimal to no effect on the signal. In one embodiment, the amorphous ferromagnetic material layer may be TbFeCo. It is to be understood that amorphous ferri-magnetic material layers other than TbFeCo are contemplated.

Figure 3A:
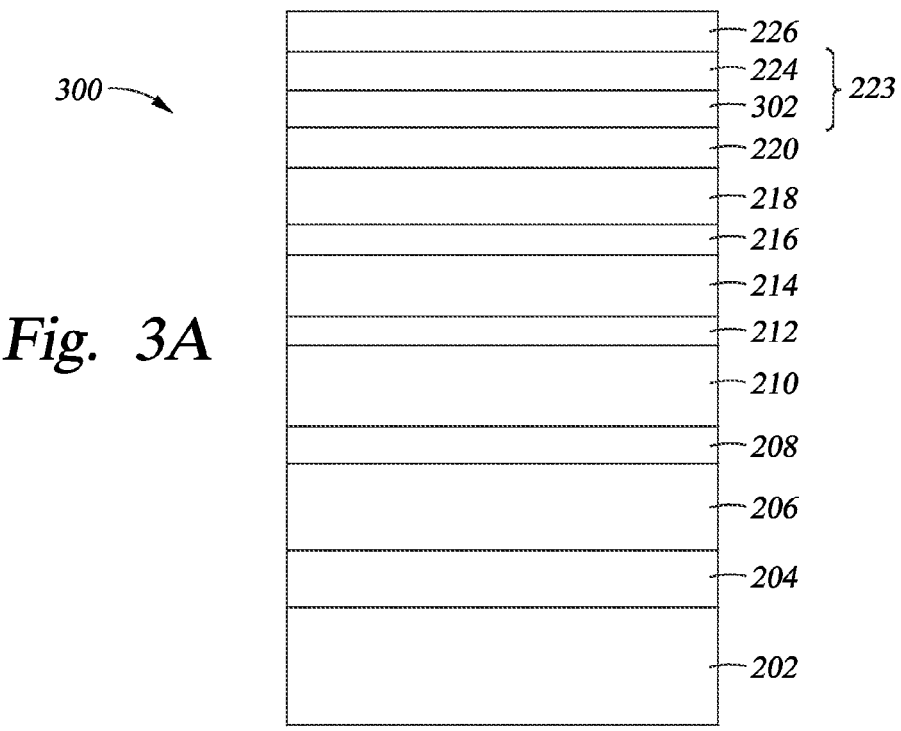
FIGS. 3A-3C are schematic illustrations of PMR stacks according to one embodiment.
Figure 3B:
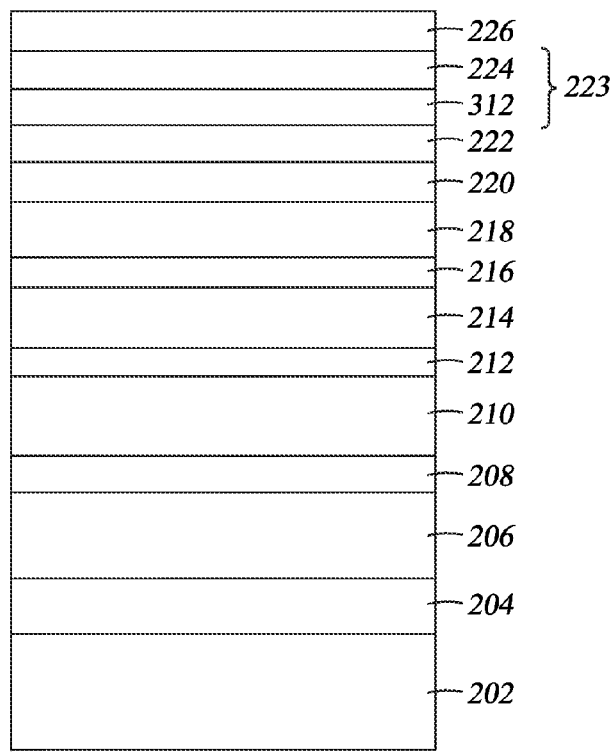
Figure 3C:
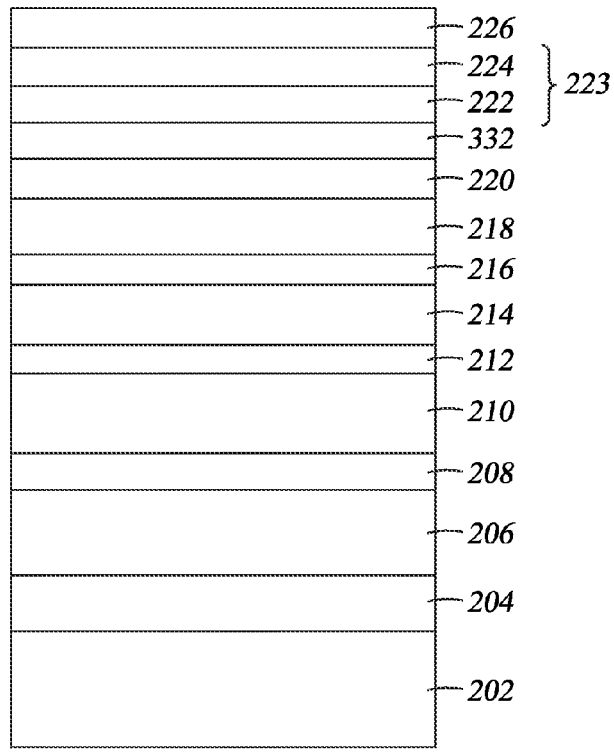

FIGS. 3A-3C are schematic illustrations of PMR stacks according to one embodiment. In the PMR stacks of FIGS. 3A-3C, an amorphous ferri-magnetic material layer is disposed within the capping structure 223. In one embodiment, the thickness of the amorphous ferri-magnetic material layer greater than zero and less than 1 nm. In another embodiment, the amorphous ferri-magnetic material layer is between about 0.4 nm and 2 nm. In one embodiment, the amorphous ferri-magnetic material layer includes Tb. In another embodiment, the amorphous ferri-magnetic material layer includes TbFeCo. In one embodiment, the Tb may be present in an amount of greater than zero and up to 30 percent by weight. The composition of the amorphous ferri-magnetic material layer may be chosen such that the Ms is low relative to rest of the media stack. TbFeCo is amorphous (2-5 nm nano-crystallites), has low Ms, and is expected to have low lateral exchange coupling relative to a CoPt based cap while possessing high $K_u$. It is believed that the unique property of amorphous ferri-magnetic material, and in particular TbFeCo, helps to reduce the high frequency noise while maintaining the signal.

In the embodiment shown in FIG. 3A, the PMR 300 includes an amorphous ferri-magnetic material layer 302 is disposed within the capping structure 223 and on the third EBL 220 and is used in place of the first capping layer 222. The second capping layer 224 is still present in the capping structure 223.

In the embodiment shown in FIG. 3B, the PMR 310 includes an amorphous ferri-magnetic material layer 312 used within the capping structure 223 in addition to the first capping layer 222 and the second capping layer 224. The first capping layer 222 is disposed on the third EBL 220. The amorphous ferri-magnetic material layer 312 is disposed on the first capping layer 222. The second capping layer 224 is disposed on the amorphous ferri-magnetic material layer 312.

In the embodiment shown in FIG. 3C, the PMR 320 includes an amorphous ferri-magnetic material layer 322 that is disposed within the capping structure 223. The amorphous ferri-magnetic material layer 322 is disposed on top of the second capping layer 224. The second capping layer 224 is disposed on the first capping layer 220.

Table I shows a comparison of results when no amorphous ferri-magnetic material layer is present in the capping structure and when an amorphous ferri-magnetic material layer is not present.

TABLE I

| Disk | Trackwidth Uin | Overwrite dB | SNR dB |
|---|---|---|---|
| Relative to Reference Disk | 0 | 0 | 0 |
| Disk w/TFC | 3.6% | −3.0% | 0.8% |

Figure 4A:
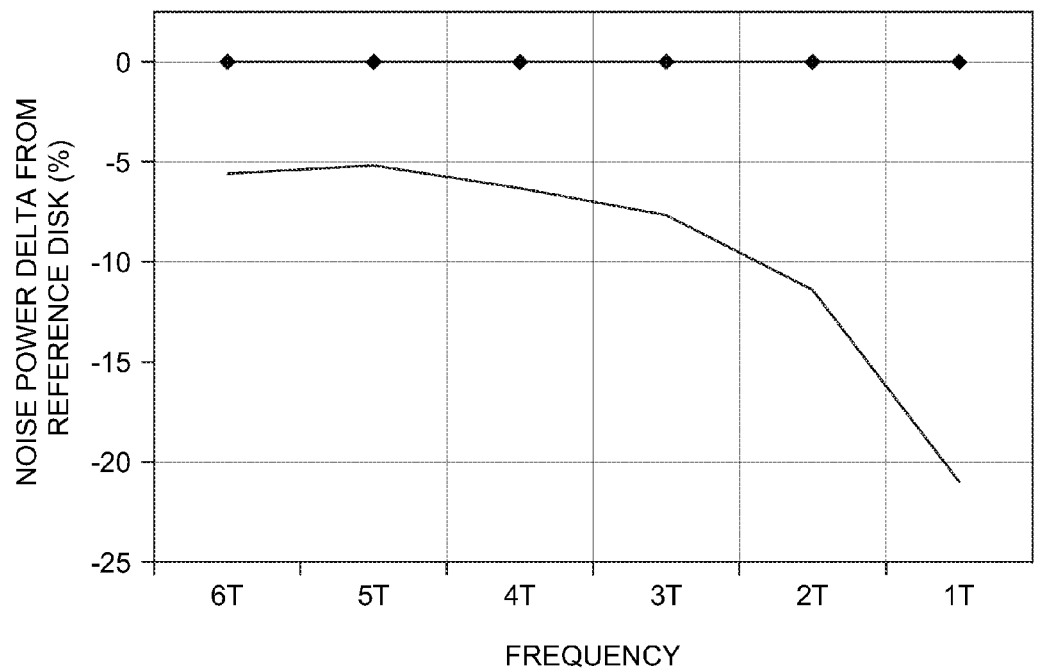
FIG. 4A is a graph illustrating how noise decreases with the presence of an amorphous ferri-magnetic material layer in the PMR media stack.

FIG. 4A is a graph illustrating how noise decreases with the presence of an amorphous ferri-magnetic material layer in the PMR media stack. As shown in FIG. 4A, the noise is lower in the PMR media having an amorphous ferri-magnetic material layer (line with no dots) in the capping structure when compared to a capping structure without an amorphous ferri-magnetic material layer (line with dots). At higher frequencies, such as 1T and 2T, there is a significant noise reduction. In other words, the amorphous ferri-magnetic material layer reduces the noise. The noise reduction may be between about 10% and about 15% at the higher frequencies.

Figure 4B:
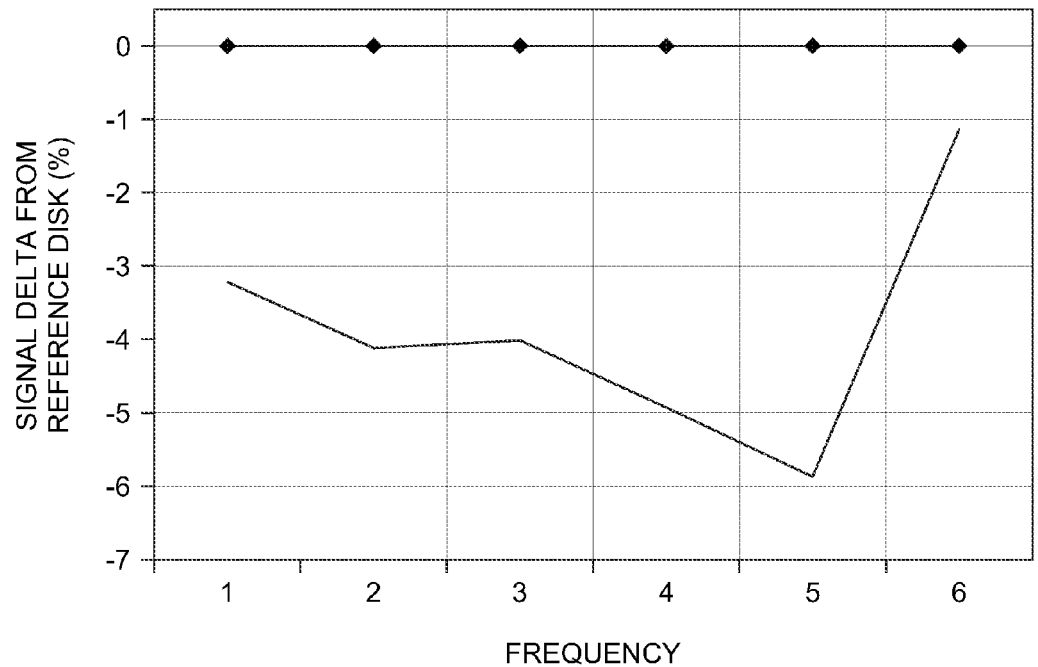
FIG. 4B is a graph illustrating how the amorphous ferri-magnetic material layer has little to no effect on the signal.

FIG. 4B is a graph illustrating how the amorphous ferri-magnetic material layer has little to no effect on the signal. As shown in FIG. 4B, the signal is minimally reduced in the PMR media when an amorphous ferri-magnetic material layer is present in the capping structure (line with no dots). In other words, the amorphous ferri-magnetic material layer has little to no effect on the signal of the PMR media.

When considered together, FIGS. 4A and 4B show that the presence of an amorphous ferri-magnetic material layer in the capping structure reduces noise and has little to no effect on signal. Thus, the amorphous ferri-magnetic material layer in the capping structure increases the SNR.

The benefit of using an amorphous ferri-magnetic material layer is the noise is reduced. Specifically, the amorphous ferri-magnetic material layer reduces the noise while having little to no effect on the signal from the PMR.

While the foregoing is directed to embodiments of the present disclosure, other and further embodiments of the disclosure may be devised without departing from the basic scope thereof, and the scope thereof is determined by the claims that follow.

The invention claimed is:

1. A magnetic recording medium, comprising:
   a substrate;
   a plurality of magnetic layers disposed over the substrate;
   a capping layer structure disposed over the plurality of magnetic layers, the capping layer structure comprising at least one capping layer and an amorphous ferri-magnetic material layer; and
   a carbon overcoat layer disposed on the capping layer structure.

2. The magnetic recording medium of claim 1, wherein the amorphous ferri-magnetic material layer comprises Tb.

3. The magnetic recording medium of claim 2, wherein the amorphous ferri-magnetic material layer comprises TbFeCo.

4. The magnetic recording medium of claim 3, wherein the amorphous ferri-magnetic material layer has a thickness of greater than 0 and less than 1 nm.

5. The magnetic recording medium of claim 4, wherein the at least one capping layer comprises a single capping layer.

6. The magnetic recording medium of claim 5, wherein the single capping layer is disposed on the amorphous ferri-magnetic material layer.

7. The magnetic recording medium of claim 1, wherein the at least one capping layer comprises a first capping layer and a second capping layer.

8. The magnetic recording medium of claim 1, wherein the amorphous ferri-magnetic material layer comprises TbFeCo and the Tb is present in an amount of up to 30 percent by weight.

9. A magnetic recording medium, comprising:
   a substrate;
   a plurality of magnetic layers disposed over the substrate;
   a capping layer structure disposed over the plurality of magnetic layers, the capping layer structure comprising at least one capping layer and an amorphous ferri-magnetic material layer, wherein the at least one capping layer comprises a first capping layer and a second capping layer, wherein the first capping layer is disposed on the amorphous ferri-magnetic material layer and the second capping layer is disposed on the first capping layer; and a carbon overcoat layer disposed on the capping layer structure.

10. A magnetic recording medium, comprising:
a substrate;
a plurality of magnetic layers disposed over the substrate;
a capping layer structure disposed over the plurality of magnetic layers, the capping layer structure comprising at least one capping layer and an amorphous ferri-magnetic material layer, wherein the at least one capping layer comprises a first capping layer and a second capping layer, wherein the amorphous ferri-magnetic material layer is disposed on the first capping layer and the second capping layer is disposed on the amorphous ferri-magnetic material layer; and
a carbon overcoat layer disposed on the capping layer structure.

11. A magnetic recording device, comprising:
a magnetic recording head disposed on a slider; and
a magnetic recording medium disposed opposite the magnetic recording head, the magnetic recording medium comprising:
a substrate;
a plurality of magnetic layers disposed over the substrate;
a capping layer structure disposed over the plurality of magnetic layers, the capping layer structure comprising at least one capping layer and an amorphous ferri-magnetic material layer; and
a carbon overcoat layer disposed on the capping layer structure.

12. The magnetic recording device of claim 11, wherein the amorphous ferri-magnetic material layer comprises Tb.

13. The magnetic recording device of claim 12, wherein the amorphous ferri-magnetic material layer comprises TbFeCo.

14. The magnetic recording device of claim 13, wherein the amorphous ferri-magnetic material layer has a thickness of greater than 0 and less than 2 nm.

15. The magnetic recording device of claim 14, wherein the at least one capping layer comprises a single capping layer.

16. The magnetic recording device of claim 15, wherein the single capping layer is disposed on the amorphous ferri-magnetic material layer.

17. The magnetic recording device of claim 11, wherein the at least one capping layer comprises a first capping layer and a second capping layer.

18. The magnetic recording device of claim 17, wherein the amorphous ferri-magnetic material layer comprises TbFeCo.

19. A magnetic recording device, comprising:
a magnetic recording head disposed on a slider; and
a magnetic recording medium disposed opposite the magnetic recording head, the magnetic recording medium comprising:
a substrate;
a plurality of magnetic layers disposed over the substrate;
a capping layer structure disposed over the plurality of magnetic layers, the capping layer structure comprising at least one capping layer and an amorphous ferri-magnetic material layer, wherein the at least one capping layer comprises a first capping layer and a second capping layer, wherein the first capping layer is disposed on the amorphous ferri-magnetic material layer and the second capping layer is disposed on the first capping layer; and
a carbon overcoat layer disposed on the capping layer structure.

20. A magnetic recording device, comprising:
a magnetic recording head disposed on a slider; and
a magnetic recording medium disposed opposite the magnetic recording head, the magnetic recording medium comprising:
a substrate;
a plurality of magnetic layers disposed over the substrate;
a capping layer structure disposed over the plurality of magnetic layers, the capping layer structure comprising at least one capping layer and an amorphous ferri-magnetic material layer, wherein the at least one capping layer comprises a first capping layer and a second capping layer, wherein the amorphous ferri-magnetic material layer is disposed on the first capping layer and the second capping layer is disposed on the amorphous ferri-magnetic material layer; and
a carbon overcoat layer disposed on the capping layer structure.

* * * * *